(12) United States Patent
Asher et al.

(10) Patent No.: US 8,348,160 B2
(45) Date of Patent: Jan. 8, 2013

(54) ENHANCING DISCOVERY SERVICES IN AN EPC NETWORK

(75) Inventors: Anthony C. Asher, Bethesda, MD (US); Christian C. Clauss, Meinier (CH); Shrinivas S. Kulkarni, Bangalore (IN); Gary Robinson, Morgan Hill, CA (US)

(73) Assignee: Frequentz, LLC, Del Mar, CA (US)

( * ) Notice: Subject to any disclaimer, the term of this patent is extended or adjusted under 35 U.S.C. 154(b) by 895 days.

(21) Appl. No.: 11/771,532

(22) Filed: Jun. 29, 2007

(65) Prior Publication Data
US 2009/0001162 A1    Jan. 1, 2009

(51) Int. Cl.
*G06F 19/00* (2011.01)

(52) U.S. Cl. .......................................... 235/385; 235/375

(58) Field of Classification Search .................. 235/385; 340/539.26
See application file for complete search history.

(56) References Cited

U.S. PATENT DOCUMENTS

| | | | |
|---|---|---|---|
| 6,520,544 B1 | 2/2003 | Mitchell et al. | |
| 6,732,921 B1 * | 5/2004 | Heuft et al. | 235/381 |
| 7,091,861 B2 | 8/2006 | Schmidtberg et al. | |
| 7,136,832 B2 * | 11/2006 | Li et al. | 705/34 |
| 2004/0246130 A1 * | 12/2004 | Lambright et al. | 340/539.26 |
| 2006/0080819 A1 | 4/2006 | McAllister | |
| 2006/0124737 A1 | 6/2006 | Oh et al. | |
| 2006/0153579 A1 * | 7/2006 | Phipps et al. | 399/24 |
| 2006/0238334 A1 | 10/2006 | Mangan et al. | |
| 2008/0109411 A1 * | 5/2008 | Young et al. | 707/3 |
| 2008/0270363 A1 * | 10/2008 | Hunt et al. | 707/3 |

* cited by examiner

*Primary Examiner* — Thien M Le
*Assistant Examiner* — Sonji Johnson
(74) *Attorney, Agent, or Firm* — Mollborn Patents, Inc.; Fredrik Mollborn

(57) ABSTRACT

Methods and apparatus, including computer program products, implementing and using techniques for providing a discovery service that provides a mapping from an electronic product code to electronic product code information services that include information about an item represented by an electronic product code. The discovery service includes a database containing a list of custodians for the item and a service interface through which electronic product code information services and applications can access the entries in the list. The list includes an entry for each custodian. Each entry includes the electronic product code number, a pointer to an electronic product code information service associated with the custodian, and a trip identifier for the item. The service interface includes several services enabling traceability of the item represented by the electronic product code. Methods and apparatus, including computer program products for using a trip identifier in a discovery service are also described.

28 Claims, 4 Drawing Sheets

Supply Chain

ENHANCING DISCOVERY SERVICES IN AN EPC NETWORK

BACKGROUND

This invention relates to RFID (Radio Frequency Identification) technologies used in conjunction with EPC (Electronic Product Code) information applications. Electronic Product Codes (EPC) is a family of coding schemes for RFID (Radio Frequency IDentification) tags. The EPC is designed to meet the needs of various industries, while guaranteeing the uniqueness for all EPC-compliant tags. All EPC numbers contain a header identifying the encoding scheme that has been used. This in turn dictates the length, type and structure of the EPC. EPC coding schemes typically contain a serial number which can be used to uniquely identify a single object.

The RFID and EPC technologies provide the basis for traceability applications that gather data about tagged items as they move through a supply chain. Some examples of items include raw materials, parts, finished goods and Reusable Transport Items (RTI's) used to transport items around the world. The collected data can be analyzed to better understand and optimize the supply chain through techniques, such as track and trace, and through metrics, such as usage, dwell time, down time, Mean Time Between Failure and inventory.

Track and trace and analytic applications that span links in the supply chain make use of the chain of custody or pedigree of tagged items. The chain of custody or pedigree can be determined through a Discovery Service that maintains a list of custodians for an item. Track and trace techniques and supply chain analytics are of interest to those directly involved in the commercial supply chain—manufacturers, distributors, transportation service providers and retailers. In many cases, authorities and governing bodies can also find value in and require access to this information, for example: port authorities, customs and excise agencies and import/export and border control.

The primary means of identification for tagged items is the EPC, which can be encoded on an RFID tag or a bar code or using some other identification technology. Various agencies, authorities and industries may require use of additional identifiers, for example, the World Customs Organization has defined the Unique Consignment Reference (UCR), which "Like an electronic staple designed for e-commerce, a UCR binds information together all the bits of date about a trade transaction, from initial order and consignment of goods by a supplier, to the movement of those goods and arrival at the border, through to their final delivery to the importer" (WCO Unique Consignment Reference (UCR), June 2004) or "Freight containers—Coding, identification and marking" (ISO 6346:1995), which requires a defined container ID to be visible on the outside of a container.

In the case of containers transporting goods across international boundaries, RFID readers or similar devices will read the EPC code, but customs authorities will expect to use UCR and a customs agent on the ground in a port may have no access to electronic readers or information systems and may only be able to reference the container ID that is marked on the outside of the container. This is one example of a common situation that occurs where different organizations, authorities and businesses cooperate to conduct business while using distinct identification methods.

Furthermore, reusable transport items (RTIs) including pallets, totes and containers are used throughout the supply chain to aggregate items for transportation. Using RFID technologies, RTIs can be tagged in the same way as the items they contain. Just like for any other items, this allows the owners and users of the RTIs to gather data about the movement and use of the RTIs, which can be analyzed to better understand and optimize use of RTIs.

However, unlike finished goods, which typically traverse a supply chain once from a manufacturer to an end user, RTIs are repeatedly used and may circulate around the supply chain for several years. While RTIs can be tagged and identified in the same way as other items, this is not sufficient information to identify a specific trip that the RTI makes through a supply chain because the same EPC will be used every trip. Using EPC alone, the discovery service cannot distinguish trips, so the chain of custody for an RTI would start with its first use and continue through all trips to the latest. In the life of an RTI, this might include being used by competitive businesses. Thus, there is a need for improved techniques to provide correct track and trace information and to maintain confidentiality for RTIs.

SUMMARY

In general, in one aspect, the invention provides methods and apparatus, including computer program products, implementing and using techniques for providing a discovery service that provides a mapping from an electronic product code to electronic product code information services that include information about an item represented by an electronic product code. The discovery service includes a database containing a list of custodians for the item and a service interface through which electronic product code information services and applications can access the entries in the list. The list includes an entry for each custodian. Each entry includes the electronic product code number, a pointer to an electronic product code information service associated with the custodian, and a trip identifier for the item. The service interface includes several services enabling traceability of the item represented by the electronic product code.

In general, in another aspect, the invention provides methods and apparatus, including computer program products, implementing and using techniques for using a trip identifier in a discovery service mapping an electronic product code to a set of electronic product code information services that include information about an item represented by an electronic product code. A database and a service interface are provided in the discovery service, the database contains a list of custodians for the item. The list includes one entry for each custodian. Each entry includes the electronic product code number, a pointer to an electronic product code information service associated with the custodian and a trip identifier for the item. The service interface can access the entries in the list, and includes several services enabling traceability of the item represented by the electronic product code.

The invention can be implemented to include one or more of the following advantages. Multiple alternate IDs can be used in addition to the EPCs as keys into the discovery service. No external systems are needed to determine an EPC from another identifier such as UCR or container ID, which avoids unnecessary duplication of data and logic and the introduction of additional inefficiencies if information has to be accessed from multiple systems in order to resolve the mapping before accessing the discovery service. Thus, the alternate ID creates for greater flexibility for organizations using identifiers different from the EPC. It also provides for added security and increased efficiency, since all translations take place internally within the discovery service. EPCs and the existing EPC Network infrastructure can be used for RTIs, while meeting application and business requirements to partition the information into trips. By using a simple identifier that is allocated and managed by the discovery service, these requirements are met while minimizing the impact on other parts of the EPC Network. Only the originator of a trip is required to be aware of the need to supply additional information to the discovery service.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

General Overview

Figure 1:
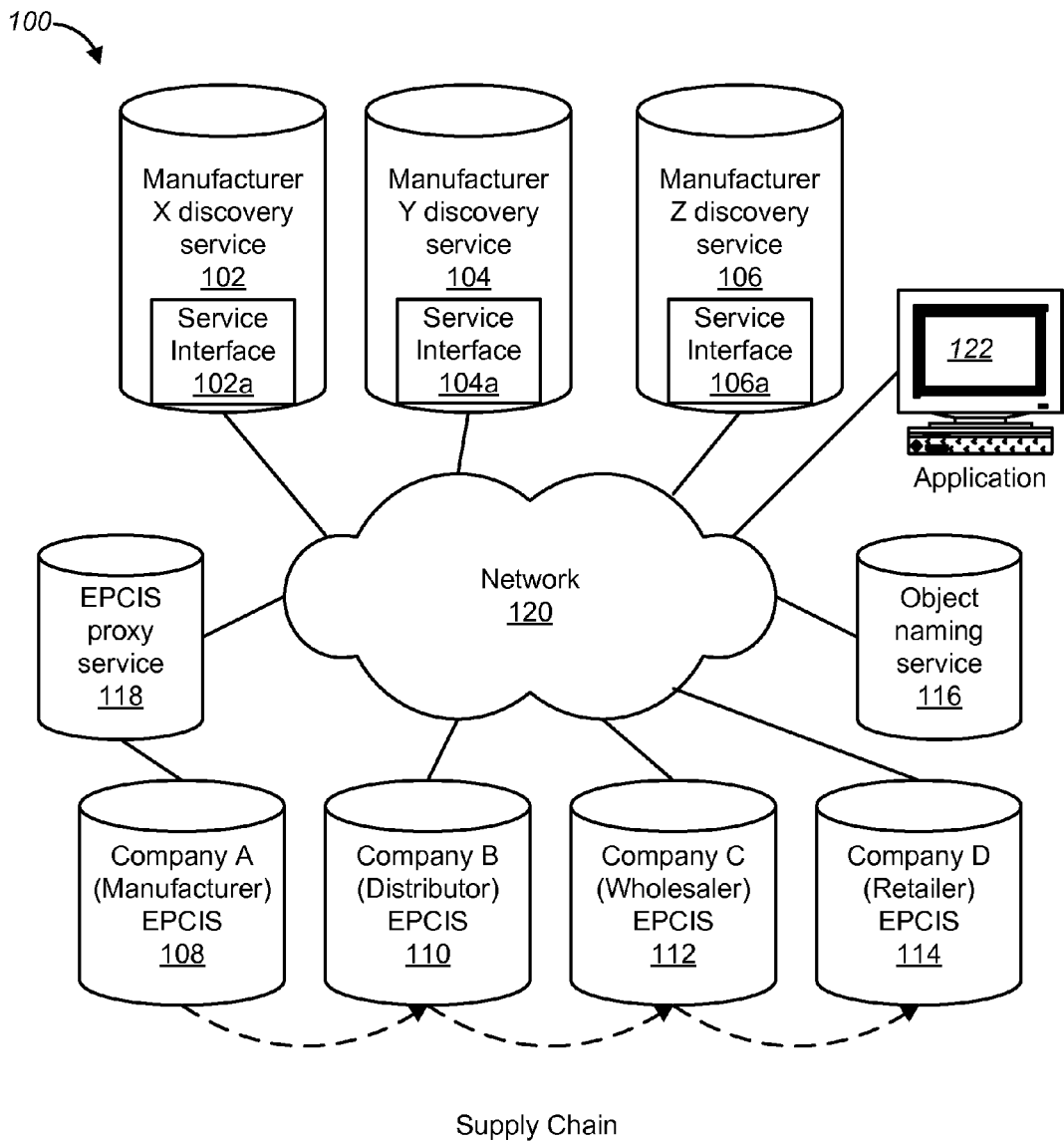
FIG. 1 shows a schematic view of an EPCglobal network in accordance with one embodiment of the invention.

As shown in FIG. 1, an exemplary EPCglobal network (100) includes several discovery services (102, 104, 106), several EPCISs (108, 110, 112, 114), an object naming service (116), an EPCIS proxy service (118) and a network (122) over which the different components of the EPCglobal network (100) communicate. In some embodiments of the invention, the discovery services (102, 104, 106) include a database and a set of service interfaces. The discovery services (102, 104, 106) simplify the data exchange process by offering a service that links information about RFID-enabled items as the items move through a supply chain from a manufacturer (108), through a distributor (110) and a wholesaler (112) to a retailer (114). As an item passes through the supply chain and is registered by RFID readers, the corresponding EPCIS (108, 110, 112, 114) sends data to the appropriate discovery service (102, 104, 106). The data is received through the respective discovery services interfaces (102a, 104a, 106a), which will be described in further detail below and contain services that enable a secure and privacy-preserving communication between the EPCISs (108, 110, 112, 114) and the discovery services (102, 104, 106). This allows trading partners to find all parties who had possession of a given item and to share RFID events about that item. The trading partners can thereby proactively manage their supply chains. Typically, these operations are carried out using special applications (122), which can communicate with the different entities in the EPC global network (100). It should be noted, however, that the applications (122) can also be used by companies and other entities that are not actively involved in a supply chain scenario, but have received permission to obtain information about a specific product or set of products. Further details of how this is accomplished will be described below with reference to FIGS. 2-4.

As can be seen in FIG. 1, in some embodiments of the invention, the discovery services (102, 104, 106) are associated with the manufacturer of a tagged item. This enables the discovery services (102, 104, 106) to be distributed and scaled, while having a simple way to know which discovery service to communicate with when registering custody of an item or querying the chain of custody for an item, as will be discussed in further detail below. The object naming service (116) can be queried by various applications to provide information about which discovery service (102, 104, 106) contains information about a particular EPC (or to find the manufacture of a particular EPC). It should be noted that although the manufacturer is responsible for providing the discovery service (102, 104, 106), the manufacturer does not actually have to run the discovery service (102, 104, 106), for example, the service can be hosted by another company, industry association, or government body. Regardless of whom hosts the discovery service (102, 104, 106), the EPC can be used to query the object naming service (116) to determine the manufacturer and to find the corresponding discovery service (102, 104, 106).

In some implementations, the object naming service (116) does not point directly to the manufacturer's discovery service (102, 104, 106), but instead to a local object naming service associated with the manufacturer. The local object naming service is then queried to get a pointer to the appropriate discovery service (102, 104, 106). In some implementations the EPCglobal network (100) includes EPCIS proxy services (118), for example, for companies, such as company A (108) that would like to keep their network address anonymous. The network (120) through which the various entities communicate can be a public or private network, such as the Internet, and the communication over this network (120) can be done through any conventional wired or wireless means.

Figure 2:
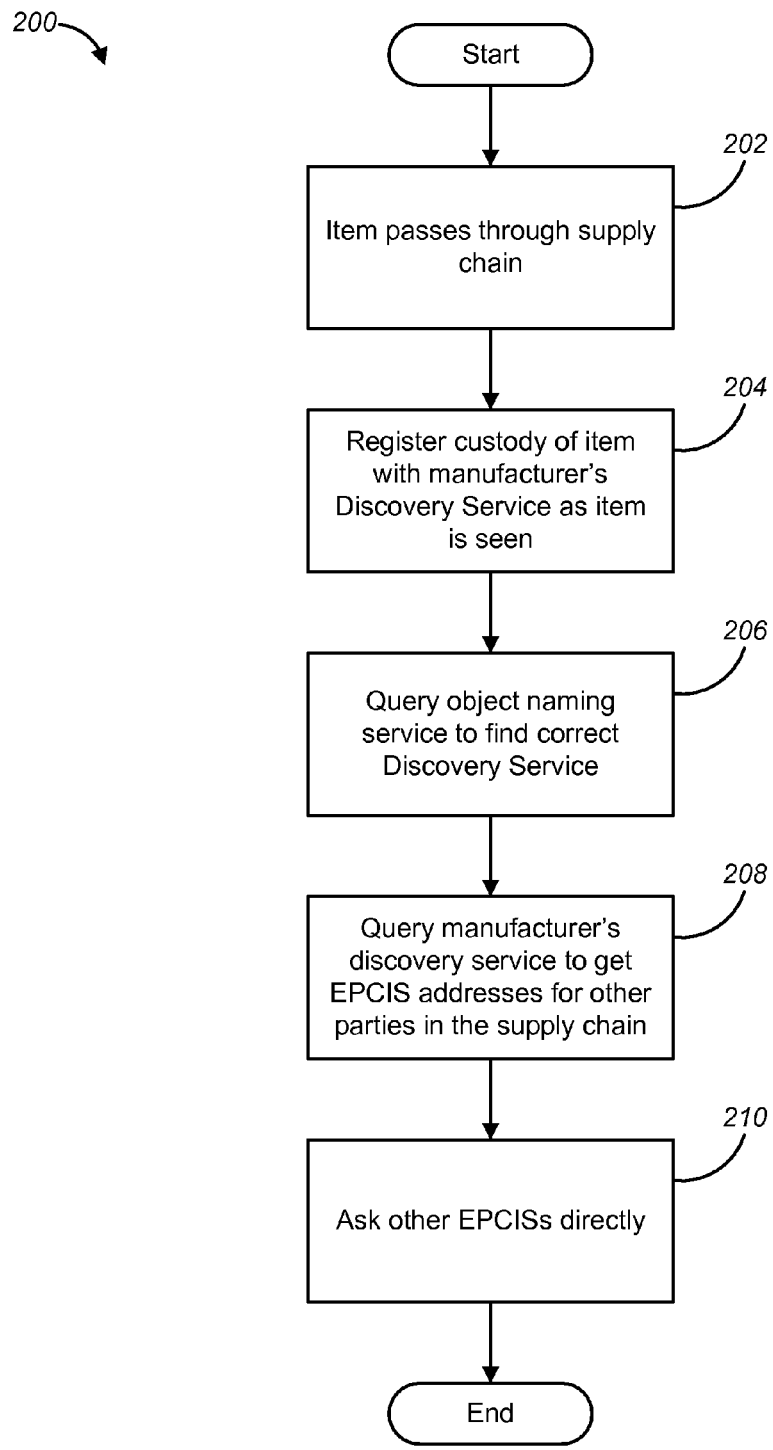
FIG. 2 is a flowchart showing an exemplary information exchange between the various entities in FIG. 1.

In some implementations when the service interfaces (102a, 104a, 106a) of the discovery services (102, 104, 106) are exposed to the network (120), such as the Internet, they can be invoked by any computer on the network (120). However, the invoker must be authorized by an authoritative party, such as EPCglobal, before the service interfaces (102a, 104a, 106a) of the discovery services (102, 104, 106) can be used. After registration with the authoritative party, a trusted third party may issue a signed certificate to the invoker. This signed certificate is used by the invoker in all transactions with the discovery services (102, 104, 106). The authorization and certificate can be used to limit read or write access to certain data elements. When a service interface (102a, 104a, 106a) is invoked, a log is also created, so that all transactions involving the discovery services (102, 104, 106) are recorded. The service interfaces (102a, 104a, 106a) allow authorized companies to register EPCs and EPCIS URL links when they manufacture or receive a new item. Additionally, authorized companies can retrieve links to all EPCISs that contain events for a specific EPC. In some implementations the discovery services (102, 104, 106) store records with the following attributes: an EPC number of the item, a URL or pointer to the EPCIS that submitted this record to indicate that it had custody of the item, a certificate of the company whose EPCIS submitted this record, a visibility flag indicating whether the record can be shared with anybody, or only with parties who submitted records about the same EPC, that is, supply chain partners, and a timestamp of when the record was inserted Operations within the EPCglobal Network An exemplary general process involving the various entities of FIG. 1 will now be described with reference to FIG. 2. As can be seen in FIG. 2, the process (200) starts with an item passing through a supply chain, as shown in FIG. 1, from the manufacturer (108) through the distributor (110) and wholesaler (112) to the retailer (114) (step 202). As the item passes through the supply chain, each EPCIS along the supply chain registers custody of the item with the manufacturer's discovery service (step 204). In some embodiments, the registration only occurs when the EPCIS captures an event about the EPC for the first time. By registering the EPC with the discovery service (104), the EPCIS declares that the business or organization associated with the EPCIS had custody of the item associated with the EPC and is thus a keeper of information about the item.

Next, a participant in the supply chain, for example, the retailer (114) would like to search for information about an item with a given EPC that the retailer (114) has received. The retailer (114) must find the EPCISs of all companies that have had prior custody of the item, that is, the manufacturer (108), the distributor (110) and the wholesaler (112). Unless the retailer (114) already knows the address of the discovery service (104), the retailer (114) queries an object naming service (116) to find the correct discovery service (step 206). The object naming service (116) returns the address of the manufacturer's local object naming service to the retailer. The retailer queries the local object naming service to get the address of the discovery service (104). The retailer (114) then queries the manufacturer's discovery service (104) to get the EPCIS addresses for the other parties in the supply chain (step 208). The retailer (114) then queries the EPCIS for each participant in the supply chain directly (step 210) using the retrieved addresses, and obtains the requested information about the EPC, which ends the process (200). It should be noted that some of the obtained addresses may not point to a company's EPCIS directly because the company may have decided to be anonymous and use a third party EPCIS proxy service. This is illustrated, for example, in FIG. 1, where Company A (108) communicates with the network (120) through a third party EPCIS proxy service (118).

Using Alternate Identification Keys in the Discovery Services

As was described above, the discovery services (102, 104, 106) maintain a list of custodians for items tagged with an EPC. In order to facilitate the understanding of the various embodiments of the invention, reference will be made below to a single discovery service (102), but it should be understood that the same concepts apply to an EPC network such as the one illustrated in FIG. 1, which includes multiple discovery services (102, 104, 106). In some embodiments, the list of custodians maintained by the discovery service (102) contains one entry for each custodian. An entry in the list includes the EPC, a timestamp, a pointer to the custodian's EPCIS (108) and one or more security flags.

In order to support additional identifiers, such as the UCR discussed above, in some embodiments users having appropriate authority can define one or more alternate identifiers (alternate IDs) for an EPC. In general, an alternate ID includes a name and a value which are associated with the EPC. In some embodiments, the alternate IDs are defined by invoking specialized services for this purpose on the EPC network. When an alternate ID service is invoked, the service associates the EPC with a name and a value provided by a user. For example, using the container example discussed above, a first alternate ID defined for EPC '123' can have the name is 'UCR' and the value '456'. A second alternate ID defined for EPC '123' can have name 'Container ID' and the value '789'.

Once the alternate IDs have been defined for the EPC, they are stored in the discovery service (102). As was described above, basic services or APIs of the discovery service (102) support access to custody information based on the EPC. For example, a 'get last entry' service can take an EPC and return the last entry in the list, and a 'get all entries' service can take an EPC and return the entire list of custodians.

In addition to these basic services or APIs (102a) of the discovery service (102), additional services are provided in various embodiments of the invention, which allow users of the discovery service (102) to ask the discovery service (102) to perform a bi-directional translation between an alternate ID and a corresponding EPC, or to use an alternate ID in service calls to retrieve all or part of the chain of custody or associated information. The translation services take as input the name and value of an alternate ID and return the EPC to the querying user. In the example above, calling a translation service with name 'UCR' and value '456' returns EPC '123'.

The basic services or APIs (102a) for the discovery service (102), such as the 'get last entry' and 'get all entries' services discussed above will accept the alternate ID name and value and return the appropriate information by internally translating from the alternate ID to the EPC. For example, calling 'get last entry' service with ID name 'UCR' and value '456' will return the last entry for EPC '123'.

Without the alternate ID, the EPC would be the only key into the discovery service (102). As a result, the logic required to determine EPC from another identifier such as UCR or container ID would have to be managed in external systems. Any and all applications requiring access to the chain of custody for a tagged item would need to be able to map other identifiers to EPC prior to querying the discovery service (102), which would result in unnecessary duplication of data and logic and could introduce additional inefficiencies if information has to be accessed from multiple systems in order to resolve the mapping before accessing the discovery service (102). Thus, the alternate ID creates for greater flexibility for organizations using identifiers different from the EPC. It also provides for added security and increased efficiency, since all translations take place internally within the discovery service (102) and no external systems need to be used.

Reusable Transport Items

In some embodiments of the invention, the discovery service (102) can also contain information that is specific to reusable transport items (RTIs). As was described above, RTIs include, for example, pallets, totes and other assets that are used during transportation of goods. The RTIs repeatedly circulate the supply chain, that is, an RTI can be used for several individual trips during its lifetime. A pallet, for example, may last for as long as 20 years and a tote may be used for as long as 5 years, during which time they will make a multitude of trips through one or more supply chains.

Similar to any other items, RTIs can be identified using EPCs and discovery services (102, 104, 106) can be used to maintain a list of custodians for the RTIs. There are also a variety of alternate IDs for RTIs. Some examples of alternate IDs for RTIs include a Serial Shipping Container Code (SSCC), a Global Returnable Asset Identifier (GRAI) and a Global Individual Asset Identifier (GIAI). Similar to the EPCs, these alternate IDs are "static", that is, they are not sufficient to provide RTI information to be used in various track and trace applications, since they cannot distinguish between individual trips.

For this reason, in some embodiments, a specific trip identifier is used in the discovery service (102) to identify individual trips for RTIs. How the trip identifier is used will now be explained with reference to FIG. 3, which shows an exemplary process (300) for using a trip identifier for an RTI which moves in a supply chain between the various entities in FIG. 1.

Figure 3:
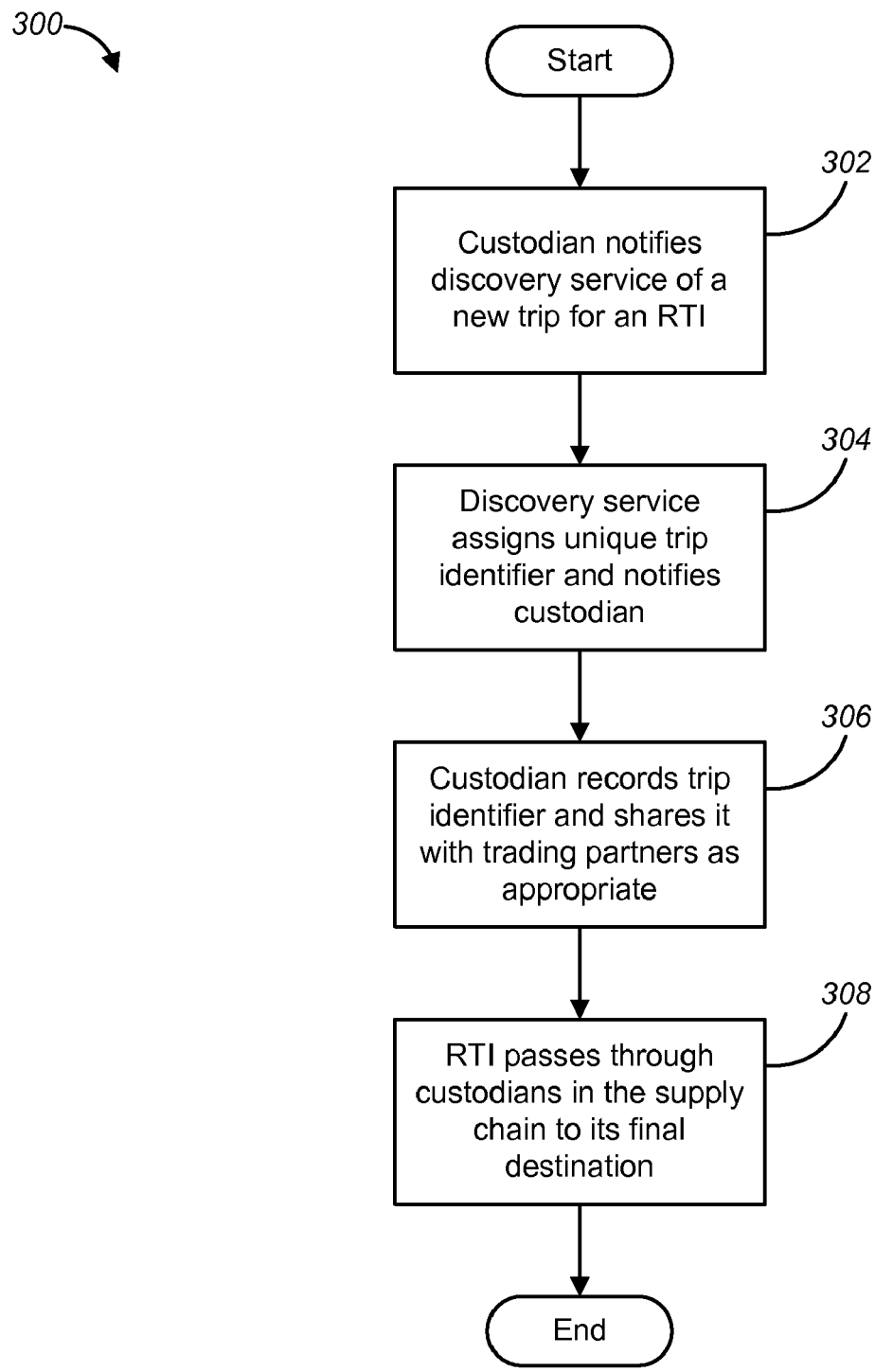
FIG. 3 is a flowchart showing a process for using a trip identifier for an RTI as the RTI moves between the various entities in FIG. 1

As can be seen in FIG. 3, the process (300) starts by a custodian of an RTI that initiates a new trip through a supply chain notifying the discovery service (102) that a new trip is started (step 302). The notification can be made, for example, through an API (102a) for the discovery service (102) or by including an extra parameter indicating a new trip with the notification. In some embodiments, the custodian can also supply a user-defined identifier, such as a shipment number, a UCR or some other kind of identifier assigned by the custodian that starts the trip, as was described above.

The discovery service (102) then assigns a unique trip identifier and returns the identifier to the custodian (step 304). Just like for regular items, the discovery service (102) has a list which contains one entry for each custodian, and each custodian notifies the discovery service (102) when it takes custody of the item. In addition, each RTI entry in the list also includes the assigned trip identifier. In some embodiments, the trip identifier is merely a number, such as an integer, which is sufficient to uniquely identify trips. The integer can later be incremented when a new trip is initiated. In other embodiments, the trip identifier can be generated using some kind of randomization algorithm, as is well-known to those of ordinary skill in the art. This avoids the use of sequential numbers for sequential trips and may provide extra security, since it will be impossible for a party in a particular trip to figure out a prior trip identifier for the purpose of inferring competitor information from previous trips of the RTI through various supply chains.

Next, the custodian records the trip identifier and shares it with trading partners as appropriate (step 306). The RTI then passes through the supply chain is handled by various custodians (step 308) until it reaches its final destination, which ends the process. In some embodiments, as each new custodian in the supply chain notifies the discovery service (102) that it has custody of the RTI, the discovery service (102) adds the trip identifier to the new entry in the list. In other embodiments, the custodian can be required to supply the trip identifier to the discovery service (102) or the discovery service (102) may return the trip identifier to the custodian.

The end of a trip through a supply chain can be defined in various ways. In some embodiments the end is defined by the end receiver (e.g., a store location) explicitly informing the discovery service (102) that this is the final destination for the RTI. In other embodiments, the end of a trip for an RTI can be inferred from the fact that a new trip is begun. This leaves the final location of the trip more open-ended, for example, since the RTI after being unloaded may go back to the RTI manufacturer for repair or servicing before being redeployed on a new trip. What constitutes the final location of a trip in such a situation may depend on who is driving the process. For example, a manufacturer of an item loaded on an RTI that moves through a supply chain from the manufacturer to the store may consider the final trip location for the RTI to be when the RTI reaches the store. On the other hand, a manufacturer of the RTI itself may be more interested in the "bigger picture," for example, what fraction of the RTIs that they send out to a particular item manufacturer are returned and have to be repaired, how long time the RTIs spend on a particular trip, and so on.

Similar to regular items, queries for an RTI can be issued to the discovery service by the various parties in the EPC network. In contrast to regular items, which can be queried using an EPC only, queries to the discovery service (102) for RTIs include both the EPC and the trip identifier, that is, they take the form of "return all entries for EPC '123' and trip identifier '4567'", and "return the last entry for EPC '789' and trip identifier '8910'", respectively.

In some embodiments, if the query does not contain a specific trip identifier, the discovery service (102) assumes the latest trip. In other embodiments, the discovery service (102) provides queries that return trip identifiers based on other parameters, such as the trip identifiers used during a period of time. For example, the RTI owner may want to query information about the RTI for the past month. Instead of having to store and manage all the trip identifiers itself, the RTI owner can be authorized to request this information from the discovery service (102).

In some embodiments, in order to keep the trip information secure, security is applied across the combination of EPC and trip identifier such that the discovery service (102) only returns information about the chain of custody to authorized parties, such as parties that belong to a particular supply chain, RTI owners and authorities such as port authorities, customs, and so on.

The information returned from the queries will be the same as described above for the general case, and the information can be used in similar ways to construct track and trace information, pedigree information and to derive analytics. An example of a simple query might be "Where is the pallet with EPC '123' right now?" and an example of a more complex query might be "Which pool within 50 miles of Boulder, Colo., can provide 25 Euroboxes today?"

In some embodiments, based on the other information in the list entries, the discovery service (102) can also answer queries such as how many trips the RTI has taken, minimum, maximum and average trip times and trends, minimum, maximum and average number of custodians, date the latest trip started and duration of that trip. Statistical techniques can also be employed to further enhance the information.

In some embodiments, the discovery service (102) is also capable of answering queries that return trip identifiers based on other information, such as dates and custodians EPCIS, for example, returning the trip identifiers for EPC 123 for July 2006, or returning the trip identifiers when the RTI passed through location X. In some cases, these special queries are only available to a limited number of "super users" with appropriate privileges, for example, the owners or manufacturers of the RTI, which may be able to produce and supply better services by having a better understanding of their use within the one or more supply chains in which the RTIs are used.

The various embodiments of this invention provide simple ways to allow EPCs and the existing EPC Network infrastructure to be used for RTIs, while meeting application and business requirements to partition the information into trips. By using a simple identifier that is allocated and managed by the discovery service (102), these requirements are met while minimizing the impact on other parts of the EPC Network. Only the originator of a trip is required to be aware of the need to supply additional information to the discovery service (102).

In order to fully understand a chain of custody of an item through a supply chain, it is sometimes necessary to be aware of the notion of packing hierarchies. A packing hierarchy occurs when items are packed and shipped through the supply chain. For example, in a supply chain individual medicine bottles having EPCs may be packed into a case, which in turn is packed on to a pallet by the manufacturer of the medicine bottles. When the pallet reaches a distributor, it is unpacked and repacked into totes and sent to a distribution center. At the distribution center, the totes are packed onto a new set of pallets which are sent to stores, where the individual medicine bottles are later unpacked and put up on shelves. All of these pallets, totes, cases, and so on, typically have their own EPC. Thus it is necessary to repeatedly query the EPCIS and discovery service (102) to understand the entire chain of custody. An example illustrating this is shown in FIG. 4.

Figure 4:
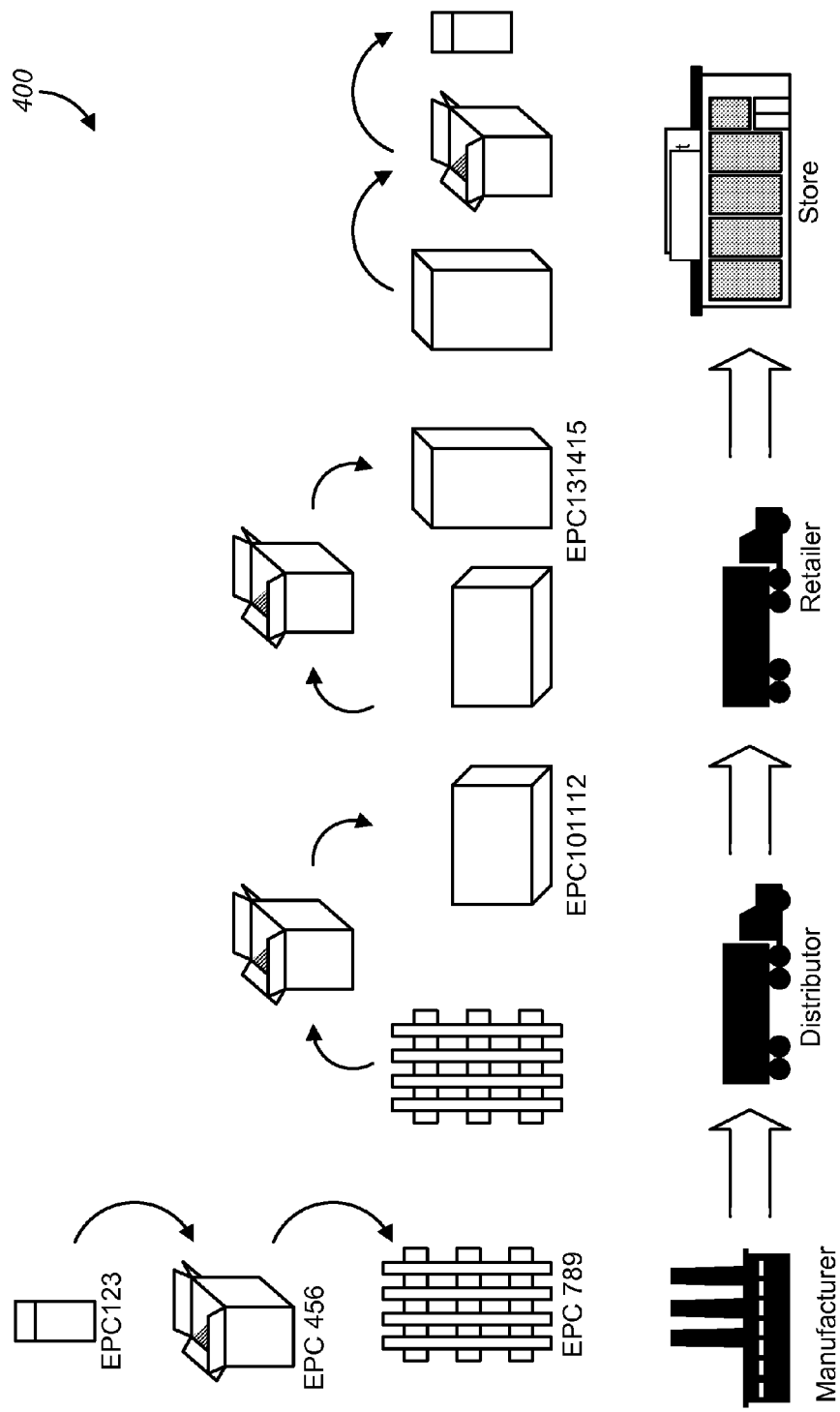
FIG. 4 is a schematic illustration of a packing hierarchy concept.

As can be seen in FIG. 4, when the discovery service (102) is asked for EPC '123', it returns a single entry—the manufacturer. The manufacturer EPCIS can then be queried for the packing hierarchy, and will return EPC '456' for the case and EPC '789' for the pallet. If the discovery service (102) is asked for the EPC '789' for the pallet, it returns the entry for the pallet at the distributor. The distributor's EPCIS can then be asked for a packing hierarchy, which will yield EPC '101112' for the tote. If the discovery service (102) is asked for the tote EPC '101112', it will respond with the entry for the tote at the retail distribution center. When the retailers distribution center EPCIS is queried for the packing hierarchy, this yields EPC '131415' for the mixed pallet. Finally, when the discovery service (102) is asked for the mixed pallet EPC '131415' it provides the entry for the mixed pallet at the retail store.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, RFID tags and readers, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, although the above discussion has been focused on the forward flow through a supply chain, the above principles work equally well for reverse logistics where the items flow the reverse way up the supply chain, and then possibly forward again. Accordingly, other embodiments are within the scope of the following claims.

The invention claimed is:

1. A discovery service operable to provide a mapping from an electronic product code to a set of electronic product code information services that include information about a reusable transport item represented by an electronic product code, the discovery service comprising:
   a database containing a list of custodians for the reusable transport item, the list including one entry for each custodian, each entry including the electronic product code, a pointer to an electronic product code information service associated with the custodian, and a trip identifier for the reusable transport item, the trip identifier uniquely identifying a specific trip among a plurality of trips through a same supply chain for the reusable transport item; and
   a service interface through which electronic product code information services and applications can access the entries in the list, the service interface including a plurality of services enabling traceability of the reusable transport item represented by the electronic product code.

2. The discovery service of claim 1, wherein the trip identifier is generated by the discovery service in response to a user informing the service interface that a new trip is started for the reusable transport item.

3. The discovery service of claim 2, wherein the trip identifier is a number that is generated through a randomization function.

4. The discovery service of claim 1, wherein the service interface is operable to provide data about the specific trip through the supply chain for the reusable transport item in response to a user supplying the trip identifier for the trip to the service interface.

5. The discovery service of claim 1, wherein the reusable transport item is part of a packing hierarchy.

6. The discovery service of claim 1, wherein each entry in the list further includes an alternate identifier representing a combination of the electronic product code and the trip identifier.

7. The discovery service of claim 6, wherein each alternate identifier includes a name and a numerical value.

8. The discovery service of claim 6, wherein the service interface is operable to provide a translation between each alternate identifier and the corresponding electronic product code and trip identifier, thereby enabling query of the discovery service using an alternate identifier.

9. The discovery service of claim 6, wherein each alternate identifier is created by the discovery service in response to a user invoking the service interface.

10. The discovery service of claim 6, wherein the service interface includes a service for returning the most recent custodian of the reusable transport item to a querying user, based on an alternate identifier.

11. The discovery service of claim 6, wherein the service interface includes a service for returning the entire list of custodians of the reusable transport item to a querying user, based on an alternate identifier.

12. The discovery service of claim 1, wherein each entry further includes one or more of: a timestamp indicating when the entry was created, and one or more security flags indicating how the information in the entry may be disclosed in response to a query.

13. A computer-implemented method for using a trip identifier in a discovery service mapping an electronic product code to a set of electronic product code information services that include information about a reusable transport item represented by an electronic product code, the method comprising:

provide a database in the discovery service, the database being operable to contain a list of custodians for the reusable transport item, the list including one entry for each custodian, each entry including the electronic product code, a pointer to an electronic product code information service associated with the custodian and a trip identifier for the reusable transport item, the trip identifier uniquely identifying a specific trip among a plurality of trips through a same supply chain for the reusable transport item; and providing a service interface in the discovery service, the service interface being operable to access the entries in the list, the service interface including a plurality of services enabling traceability of the reusable transport item represented by the electronic product code.

14. The method of claim 13, further comprising:

receiving user input informing the service interface that a new trip is started for the reusable transport item; and automatically generating the trip identifier by the discovery service.

15. The method of claim 14, wherein automatically generating the trip identifier comprises generating a number for the trip identifier through a randomization function.

16. The method of claim 13, further comprising:

receiving a user request for data about one or more specific trips for the reusable transport item, the user request including one or more trip identifiers; and providing data about the one or more trips represented by the one or more trip identifiers to the requesting user.

17. The method of claim 16, further comprising:

applying statistical techniques to the data in order to analyze and optimize the use of the reusable transport item throughout the supply chain.

18. The method of claim 13, wherein the reusable transport item is part of a packing hierarchy.

19. The method of claim 13, further comprising:

receiving a user request to associate one or more alternate identifiers with the electronic product code and the trip identifier; and associating the one or more alternate identifiers to each entry in the list.

20. The method of claim 19, wherein each alternate identifier includes a name and a numerical value.

21. The method of claim 19, further comprising providing a translation between each alternate identifier and the corresponding electronic product code and trip identifier in response to a query of the discovery service including an alternate identifier.

22. The method of claim 19, further comprising returning the most recent custodian of the reusable transport item in response to a query from a user, based on an alternate identifier.

23. The method of claim 19, further comprising returning the entire list of custodians of the reusable transport item in response to a query from a user, based on an alternate identifier.

24. The method of claim 13, wherein each entry further includes one or more of: a timestamp indicating when the entry was created, and one or more security flags indicating how the information in the entry may be disclosed in response to a query.

25. A computer program product for using a trip identifier in a discovery service mapping an electronic product code to a set of electronic product code information services that include information about a reusable transport item represented by an electronic product code, the computer program product comprising:

a tangible non-transitory computer useable storage medium having computer readable program code embodied therewith, the computer readable program code comprising:

computer readable program code configured to provide a database in the discovery service, the database being operable to contain a list of custodians for the reusable transport item, the list including one entry for each custodian, each entry including the electronic product code, a pointer to an electronic product code information service associated with the custodian and a trip identifier for the reusable transport item, the trip identifier uniquely identifying a specific trip among a plurality of trips through a same supply chain for the reusable transport item; and computer readable program code configured to provide a service interface in the discovery service, the service interface being operable to access the entries in the list, the service interface including a plurality of services enabling traceability of the reusable transport item represented by the electronic product code.

26. The computer program product of claim 25, further comprising:

computer readable program code configured to receive user input informing the service interface that a new trip is started for the reusable transport item; and computer readable program code configured to automatically generate the trip identifier by the discovery service.

27. The computer program product of claim 25, further comprising:

computer readable program code configured to receive a user request for data about one or more specific trips for the reusable transport item, the user request including one or more trip identifiers; and computer readable program code configured to provide data about the one or more trips represented by the one or more trip identifiers to the requesting user.

28. The computer program product of claim 25, further comprising:

computer readable program code configured to receive a user request to associate one or more alternate identifiers with the electronic product code and the trip identifier; and computer readable program code configured to add the one or more alternate identifiers to each entry in the list.

* * * * *